(12) United States Patent
Mielenz et al.

(10) Patent No.: US 11,120,281 B2
(45) Date of Patent: Sep. 14, 2021

(54) METHOD FOR LOCALIZING A MORE AUTOMATED, E.G., HIGHLY AUTOMATED VEHICLE (HAV) IN A DIGITAL LOCALIZATION MAP

(71) Applicant: Robert Bosch GmbH, Stuttgart (DE)

(72) Inventors: Holger Mielenz, Ostfildern (DE); Jan Rohde, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 174 days.

(21) Appl. No.: 16/480,231

(22) PCT Filed: Dec. 12, 2017

(86) PCT No.: PCT/EP2017/082432
§ 371 (c)(1),
(2) Date: Jul. 23, 2019

(87) PCT Pub. No.: WO2018/141447
PCT Pub. Date: Aug. 9, 2018

(65) Prior Publication Data
US 2020/0005058 A1 Jan. 2, 2020

(30) Foreign Application Priority Data
Feb. 2, 2017 (DE) .......................... 102017201663.9

(51) Int. Cl.
*G01C 21/30* (2006.01)
*G06K 9/00* (2006.01)
(Continued)

(52) U.S. Cl.
CPC ......... *G06K 9/00825* (2013.01); *G01C 21/30* (2013.01); *G01S 13/06* (2013.01); *G05D 1/0274* (2013.01); *G05D 2201/0213* (2013.01)

(58) Field of Classification Search
CPC . G01C 21/30; G06K 9/62; G06K 9/00; G07C 5/08; G01S 13/06
See application file for complete search history.

(56) References Cited

U.S. PATENT DOCUMENTS

2011/0130918 A1  6/2011  Kim et al.
2015/0210312 A1* 7/2015  Stein .................. G06K 9/00805
                                                 701/41
(Continued)

FOREIGN PATENT DOCUMENTS

DE  102009045326 A1  4/2011
DE  102014201158 A1  7/2015
(Continued)

OTHER PUBLICATIONS

International Search Report for PCT/EP2017/082432, dated Mar. 20, 2018.

*Primary Examiner* — Tan Q Nguyen
(74) *Attorney, Agent, or Firm* — Norton Rose Fulbright US LLP; Gerard A. Messina

(57) ABSTRACT

A method is described for localizing a highly automated vehicle (HAV) in a digital localization map, including the following steps: S1 sensing features of semi-static objects in an environment of the HAV with the aid of at least one first sensor; S2 transmitting the features of the semi-static objects as well as the vehicle position to an evaluation unit; S3 classifying the semi-static objects, the feature "semi-static" being assigned to the semi-static objects as a result of the classification; S4 transferring the features of the semi-static objects into a local driving-environment model of the HAV, when creating the local driving-environment model, it being checked whether landmarks suitable for localizing the HAV are hidden by the semi-static objects in terms of the position and/or an approach trajectory of the HAV; S5 transmitting the local driving-environment model to the HAV in the form (Continued)

of a digital localization map, the digital localization map containing only those landmarks suitable for localizing the HAV which are not hidden by semi-static objects in terms of the position and/or an approach trajectory of the HAV; and S6 localizing the HAV using the digital localization map. In addition, a corresponding system and computer program are described.

14 Claims, 2 Drawing Sheets

(51) Int. Cl.
      *G01S 13/06*     (2006.01)
      *G05D 1/02*     (2020.01)
      *G08G 1/09*     (2006.01)

(56) References Cited

U.S. PATENT DOCUMENTS

| | | | |
|---|---|---|---|
| 2017/0124476 A1* | 5/2017 | Levinson | G01S 17/931 |
| 2017/0261325 A1* | 9/2017 | Schroeder | G01C 21/04 |
| 2018/0357493 A1* | 12/2018 | Takamatsu | G08G 1/09 |
| 2019/0081802 A1* | 3/2019 | Ying | H04W 12/069 |

FOREIGN PATENT DOCUMENTS

| | | |
|---|---|---|
| JP | 2008159031 A | 7/2008 |
| JP | 2016090515 A | 5/2016 |
| WO | 2013076829 A1 | 5/2013 |
| WO | 2016113974 A1 | 7/2016 |

\* cited by examiner

METHOD FOR LOCALIZING A MORE AUTOMATED, E.G., HIGHLY AUTOMATED VEHICLE (HAV) IN A DIGITAL LOCALIZATION MAP

FIELD OF THE INVENTION

The present invention relates to a method and a system for localizing a more automated, e.g., highly automated vehicle (HAV) in a digital localization map

BACKGROUND INFORMATION

In view of an increase in the degree of automation of vehicles, ever more complex driver-assistance systems are being employed. For such driver-assistance systems and functions such as highly automated driving or fully automated driving, a great number of sensors are needed in the vehicle which permit exact sensing of the vehicle environment. In order to control the vehicle in more automated fashion, it is necessary, for example, to reliably recognize the traffic lanes, so that the vehicle may be guided within a recognized traffic lane. In the following, the term more automated is understood to mean all those degrees of automation which, in accordance with the Bundesanstalt für Straßenwesen (BASt) (German Federal Highway Research Institute), correspond to automated longitudinal guidance and lateral guidance with increasing system responsibility, e.g., highly automated and fully automated driving.

In addition, it is known that with the aid of various driving-environment sensors such as radar sensors, cameras, driving-dynamics sensors, GPS (Global Positioning System) and digital maps, a representation of the vehicle environment, the so-called driving-environment model, may be constructed, in doing which, the goal of attaining greater accuracy and safety as well as a larger visual range relative to individual data sources having the highest priority. High system robustness and system availability are especially necessary with regard to highly automated driving. Driver-assistance systems implemented today for highly automated vehicles are focused on improvement of accuracy, visual range as well as increased reliability of the detections.

A variety of possibilities are described in the related art for localizing a highly automated vehicle (HAV) in a digital map. For example, among these are methods in which only the number or density of landmarks necessary for a sufficiently accurate localization are transmitted to the HAV, so that data rates for the transmission from the server to the vehicle may be reduced or computing complexity in the vehicle may be reduced and propagation time may be accelerated. At the same time, however, it proves to be disadvantageous that landmarks may also be hidden and therefore cannot be sensed by the HAV. This leads, on one hand, to an unnecessary transmission of data, and on the other hand, to possibly poor localization accuracy, since insufficient information is available for a matching. Matching is understood to be the comparison of the recognized landmarks to those present in the maps. However, this is incompatible with high system reliability, which is necessary for automated driving.

SUMMARY

Therefore, an object of the present invention is to provide an improved method for localizing a highly automated vehicle (HAV) in a digital localization map.

According to one aspect of the invention, a method is provided for localizing a more automated vehicle, especially a highly automated vehicle (HAV), in a digital localization map, including the following steps:

S1 Sensing features of semi-static objects in an environment of the HAV with the aid of at least one first sensor;
S2 Transmitting the features of the semi-static objects as well as the vehicle position to an evaluation unit;
S3 Classifying the semi-static objects, the feature "semi-static" being assigned to the semi-static objects as a result of the classification;
S4 Transferring the features of the semi-static objects into a local driving-environment model of the HAV, in creating the local driving-environment model, it being checked whether landmarks suitable for localizing the HAV are hidden by the semi-static objects in terms of the position and/or an approach trajectory of the HAV;
S5 Transmitting the local driving-environment model to the HAV in the form of a digital localization map, the digital localization map containing only those landmarks suitable for localizing the HAV that are not hidden by semi-static objects in terms of the position and/or an approach trajectory of the HAV; and
S6 Localizing the HAV using the digital localization map.

According to the present invention, a driver-assistance system is thus disclosed for highly automated vehicles, which detects landmarks for localizing the vehicle with the aid of on-board driving-environment sensors. In addition, the landmarks are classified and possibly assigned the attribute "semi-static." In principle, it is possible that, in addition, information is transmitted from the vehicle to the server, possibly the backend server, with which the server is able to update a hypothesis about the inserted attribute "hidden" or "visible." By omitting the hidden landmarks when transmitting the local driving-environment model in the form of a digital localization map to the HAV, robustness and accuracy of the localization is increased, since in this case, the driver-assistance system of the HAV as well as the allocated driving-environment sensors of the HAV waste no computing capacity and time in identifying the landmarks which are not visible in any case, and matching them to a more comprehensive feature map expected.

According to one specific embodiment, the at least one first sensor is a stationary infrastructure sensor, in particular, the at least one infrastructure sensor being mounted on a lamppost or a traffic light, and/or the at least one first sensor is mounted on the HAV, and/or the at least one first sensor is mounted on a further HAV.

According to another specific embodiment, the features of the semi-static objects include at least one of the following features: contour, geo-position, color, dimensions, orientation in space, speed and/or state of acceleration.

Advantageously, classification step S3 is carried out by a control unit assigned to the at least one sensor and/or by the evaluation unit, and classification step S3 is carried out at least on the basis of one of the following features: contour, geo-position, color, dimensions, orientation in space, speed and/or state of acceleration of the semi-static objects.

Preferably, the evaluation unit is a Mobile Edge Computing Server, in particular, the Mobile Edge Computing Server being stationary.

According to one advantageous specific embodiment, step S4 of transferring the features of the semi-static objects into a local driving-environment model includes the step of geo-referencing the semi-static objects.

In particular, this yields the technical advantage that the driver-assistance system detects semi-static objects such as trash cans, parked vehicles or trailers, for example, classifies them and transmits their contour and geo-position to the server. Based on the traveled trajectory and the traffic-lane geometries available, the server then calculates for the approaching vehicles whether there is a possibility that landmarks located currently or in the future in the environment of the HAV could be hidden.

In one advantageous development, the respective method step of transmitting in steps S2, S5 is accomplished in each case by a radio signal.

In a further specific embodiment, step S6 of localizing the HAV using the digital localization map includes that at least one of the features of the semi-static objects is sensed by a driving-environment sensor system of the HAV, and that a control of the HAV uses matching methods to compare the at least one feature sensed by the driving-environment sensor system to the information in the localization map.

A system for localizing a highly automated vehicle (HAV) in a digital localization map forms a further subject matter of the present invention, the system including at least one first sensor which is equipped to sense features of semi-static objects in an environment of the HAV. In addition, the system includes a communication interface which is set up to transmit the features of the semi-static objects to an evaluation unit, the evaluation unit being equipped to classify the semi-static objects. The classification includes that the feature "semi-static" is assigned to the semi-static objects as a result of the classification. The evaluation unit is also equipped to transfer the features of the semi-static objects into a local driving-environment model of the HAV, the local driving-environment model containing landmarks suitable for localizing the HAV. The evaluation unit is equipped to check, when creating the local driving-environment model, whether the landmarks suitable for localizing the HAV are hidden by the semi-static objects in terms of the position and/or an approach trajectory of the HAV. Furthermore, the evaluation unit is set up to integrate only those landmarks into the local driving-environment model which are not hidden by semi-static objects in terms of the position and/or an approach trajectory of the HAV, the communication interface additionally being set up to transmit the local driving-environment model in the form of a digital localization map to the HAV. The system also includes a control of the HAV, the control being equipped to localize the HAV, using the digital localization map as well as driving-environment sensors of the HAV.

A further subject matter of the present invention is formed by a computer program, which includes program code for carrying out the method of the present invention when the computer program is executed on a computer.

In particular, the design approach of the present invention yields the technical advantage of improving the robustness and accuracy when localizing a HAV, since in the case of temporary obscurations, data to be transmitted between the server and the vehicle is reduced. Thus, neither time nor computing capacity is wasted on the part of the vehicle in detecting landmarks which are not visible in any case, and matching/comparing them to a more extensive feature map.

A further advantage is that a sufficient number of landmarks are always able to be detected for the matching, and in this way, are available in the map. In addition, obscuration situations of landmarks stored on the server may be ascertained on the basis of the reports back from the vehicles, thereby again allowing reliable localization of a highly automated vehicle in a digital map.

Although the present invention is described hereinafter mainly in connection with passenger cars, it is not restricted to them, but rather may be utilized with any type of vehicle, trucks and/or automobiles.

Further features, possibilities of application and advantages of the invention are obtained from the following description of the exemplary embodiments of the invention, which are represented in the figures. In this context, it should be noted that the features represented have only a descriptive character and may also be utilized in combination with features of other further developments described above, and are not intended to limit the invention in any way.

DETAILED DESCRIPTION

Figure 1:
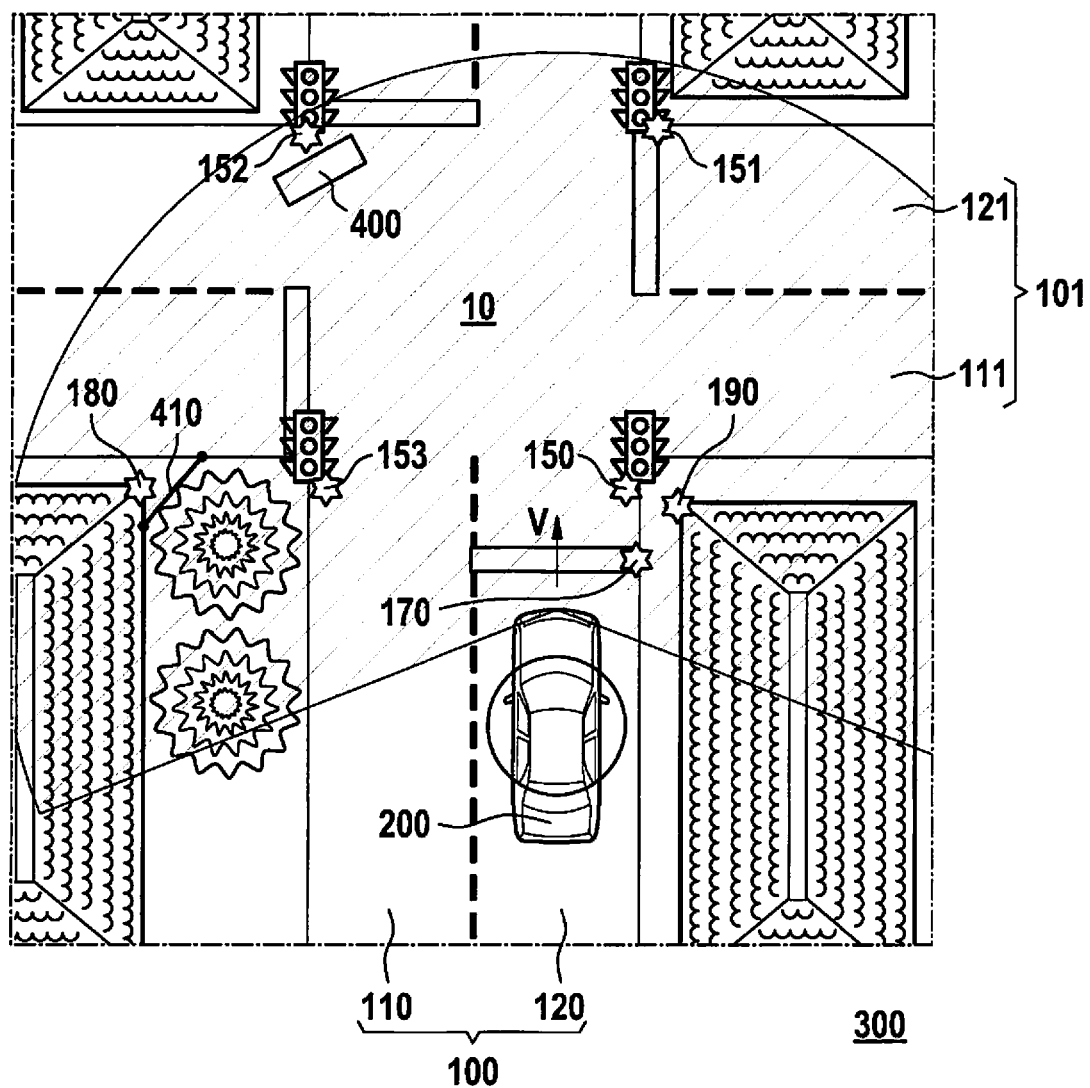
FIG. 1 a top view of a situation in road traffic, in which the method according to the present invention is used to localize a highly automated vehicle (HAV)

FIG. 1 shows a traffic junction 10 at which two road sections 100, 101, each having two lanes 110, 120, 111, 121, intersect, that are drivable by a more automated vehicle, especially by a highly automated vehicle (HAV) 200. The traffic at traffic junction 10 is regulated, inter alia, by traffic lights 150, 151, 152, 153. In addition, a first building corner 180 and a second building corner 190 are located in the surroundings of traffic junction 10. For the purposes of this example, it shall be assumed that traffic lights 150, 151, 152, 153, building corners 180, 190 as well as a stop line 170 are available in geo-referenced form and as permanent landmarks for generating a digital driving-environment model.

That means that, for example, certain features of building corner 180 necessary for recognizing building corner 180, as well as its position in a suitable coordinate system are stored in a data store in digital form and for creating a driving-environment model for a HAV. For instance, the features necessary for recognizing the building corner may be its position, the dimensions or color of the adjoining walls, its extension in the vertical direction and the like. For example, the data store may be a local evaluation unit 300, e.g., a Mobile Edge Computing Server, or else a remote server not shown. In the context of the exemplary embodiment, it is assumed that the data store is a part of local evaluation unit 300.

The use of traffic lights 150, 151, 152, 153, building corners 180, 190 as well as stop line 170 as permanent landmarks implies that their position and the features necessary to recognize them are able to be transmitted to a HAV. After receiving the corresponding information, a driver-assistance system of the HAV, employing what are termed matching methods and a suitable on-board sensor system, e.g., cameras, is able to identify the permanent landmarks and utilize their position relative to the HAV to localize the HAV in a digital map.

Moreover, FIG. 1 shows a first object 400 as well as a second object 410. For example, first object 400 may be a temporarily parked site container for road work, while second object 410 may be a temporarily erected message board, for instance. Within the context of the present application, first object 400 and second object 410 are denoted as semi-static objects, since although they are immobile in terms of the moment HAV 200 crosses, they will not remain at their position long enough that they are suitable as permanent landmarks.

As can be seen in FIG. 1, first object 400 hides traffic light 152 relative to HAV 200, while second object 410 hides first building corner 180 relative to HAV 200, so that driving-environment sensors of HAV 200, e.g., cameras, are not able to detect traffic light 152 and building corner 180 suitable in principle as permanent landmarks. Transmitting the position and the features of traffic light 152 and of building corner 180, necessary for their recognition, to HAV 200 therefore means merely an unnecessary exchange of data between evaluation unit 300 and HAV 200, as well as a waste of sensor and computing capacity of the driver-assistance system of HAV 200 in an attempt, futile from the start, to recognize traffic light 152 and building corner 180 in the environment of HAV 200.

Figure 2:
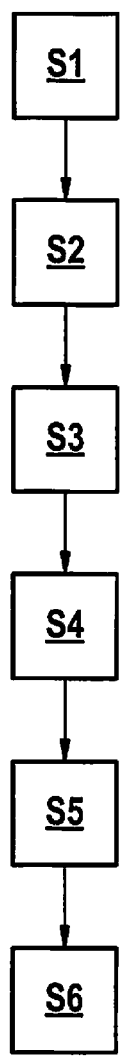
FIG. 2 a flowchart of a specific embodiment of the method according to the present invention.

In order to avoid this, in a first step of the method according to the present invention, features of semi-static objects 400, 410 in an environment of HAV 200 are sensed by at least one first sensor, see also FIG. 2. In this context, the first sensor may be a stationary infrastructure sensor that is mounted on a lamppost or on a traffic light, for example, or else a sensor which is mounted on HAV 200 itself or on a further HAV, e.g., a driving-environment camera of a HAV.

The features of semi-static objects 400, 410 may be one or more of the following features: contour, geo-position, color, dimensions, orientation in space, speed and/or state of acceleration of sensed semi-static objects 400, 410.

In a step S2, the sensed features of semi-static objects 400, 410 as well as the vehicle position are transmitted to evaluation unit 300. In so doing, preferably the transmission is carried out via a radio signal, which is why both evaluation unit 300 and the first sensor have a corresponding communication interface.

Step S3 shown in FIG. 2 includes the classification of semi-static objects 400, 410, the feature "semi-static" being assigned to semi-static objects 400, 410 as a result of the classification, given the presence of corresponding criteria. In this context, for example, one or more of the following features: contour, geo-position, color, dimensions, orientation in space, speed and/or state of acceleration of semi-static objects 400, 410 may be used as criteria for classifying the detected objects as "semi-static."

The classification may be carried out both by a control unit assigned to the at least one sensor, thus, prior to transmitting the sensed features of semi-static objects 400, 410 as well as the vehicle position to evaluation unit 300, and/or by evaluation unit 300 after it has received the features of semi-static objects 400, 410 as well as the vehicle position.

In step S4, the features of semi-static objects 400, 410 are transferred into a local driving-environment model of HAV 200, in creating the local driving-environment model, it being checked whether landmarks suitable for localizing the HAV are hidden by semi-static objects 400, 410 in terms of the position and/or an approach trajectory of HAV 200. First object 400 and second object 410 are classified as semi-static objects. In the generation of the local driving-environment model by evaluation unit 300 and the checking accompanying it, it is determined that first object 400 is hiding traffic light 152 relative to HAV 200, while second object 410 is hiding first building corner 180 relative to HAV 200.

Step S4 of transferring the features of semi-static objects 400, 410 into a local driving-environment model preferably includes the step of geo-referencing semi-static objects 400, 410.

The local driving-environment model, which is transmitted in step S5 to HAV 200 in the form of a digital localization map, therefore only contains information with respect to traffic lights 150, 151, 153, as well as with respect to second building corner 190 and stop line 170 as permanent landmarks, since they are not hidden by semi-static objects 400, 410 in terms of the position and an approach trajectory of HAV 200.

In step S6, HAV 200 is then localized by the driver-assistance system of HAV 200 using the digital localization map, in doing so, both the transmitted permanent landmarks as well as further localization information being used, e.g., the Global Positioning System (GPS).

In this context, as described above, in order to identify the permanent landmarks, step S6 of localizing HAV 200 using the digital localization map preferably includes that at least one of the features of semi-static objects 400, 410 is sensed by a driving-environment sensor system of HAV 200, and that a driver-assistance system or a control of HAV 200 utilizes matching methods to compare the at least one feature sensed by the driving-environment sensor system to the information of the localization map.

As can be gathered from the above, FIG. 1 also shows a system for localizing HAV 200 in a digital localization map, the system including the following:
- at least one first sensor, the at least one first sensor being equipped to sense features of semi-static objects 400, 410 in an environment of HAV 200,
- a communication interface which is set up to transmit the features of semi-static objects 400, 410 to an evaluation unit 300, evaluation unit 300 being equipped
  to classify semi-static objects 400, 410, the classification including that the feature "semi-static" is assigned to semi-static objects 400, 410 as a result of the classification, and further being equipped
  to transfer the features of semi-static objects 400, 410 into a local driving-environment model of HAV 200, the local driving-environment model containing landmarks suitable for localizing HAV 200, and evaluation unit 300 being equipped to check, when creating the local driving-environment model, whether the landmarks suitable for localizing HAV 200 are hidden by semi-static objects 400, 410 in terms of the position and/or an approach trajectory of HAV 200, and being set up to integrate only those landmarks into the local driving-environment model which are not hidden by semi-static objects 400, 410 in terms of the position and/or an approach trajectory of HAV 200, the communication interface additionally being set up to transmit the local driving-environment model in the form of a digital localization map to HAV 200; and
- a driver-assistance system or a control of HAV 200, which is equipped to localize HAV 200 using the digital localization map as well as driving-environment sensors of HAV 200.

The present invention is not limited to the exemplary embodiment described and illustrated. Rather, it also includes all expert further developments within the scope of the invention.

In addition to the specific embodiments described and illustrated, additional specific embodiments are conceivable which may include further modifications as well as combinations of features.

What is claimed is:

1. A method for localizing a highly automated vehicle (HAV) in a digital localization map, comprising:
   sensing features of semi-static objects in an environment of the HAV with the aid of at least one first sensor;
   transmitting the features of the semi-static objects and a vehicle position to an evaluation unit;
   classifying the semi-static objects, wherein a feature "semi-static" is assigned to the semi-static objects as a result of the classification;
   transferring the features of the semi-static objects into a local driving-environment model of the HAV, in creating the local driving-environment model, and checking whether landmarks suitable for localizing the HAV are hidden by the semi-static objects in terms of at least one of the position and an approach trajectory of the HAV;
   transmitting the local driving-environment model to the HAV as a digital localization map that contains only those landmarks suitable for localizing the HAV that are not hidden by the semi-static objects in terms of the at least one of the position and the approach trajectory of the HAV; and
   localizing the HAV using the digital localization map.

2. The method as recited in claim 1, wherein at least one of:
   the at least one first sensor is a stationary infrastructure sensor mounted on a lamppost or a traffic light, and
   the at least one first sensor is mounted on the HAV, and
   the at least one first sensor is mounted on a further HAV.

3. The method as recited in claim 1, wherein the features of the semi-static objects include at least one of the following features: contour, geo-position, color, dimensions, orientation in space, speed and state of acceleration.

4. The method as recited in claim 1, wherein:
   the classifying is carried out by at least one of a control unit assigned to the at least one sensor and the evaluation unit, and
   the classifying is carried out at least on the basis of one of the following features: contour, geo-position, color, dimensions, orientation in space, speed and state of acceleration of the semi-static objects.

5. The method as recited in claim 1, wherein the evaluation unit is a Mobile Edge Computing Server.

6. The method as recited in claim 1, wherein the evaluation unit is a stationary Mobile Edge Computing Server.

7. The method as recited in claim 1, wherein the transferring of the features of the semi-static objects into a local driving-environment model includes geo-referencing the semi-static objects.

8. The method as recited in claim 1, wherein each step of transmitting is accomplished in each case by a radio signal.

9. The method as recited in claim 1, wherein the localizing of the HAV using the digital localization map includes that at least one of the features of the semi-static objects is sensed by a driving-environment sensor system of the HAV, and that a driver-assistance system or a control of the HAV utilizes matching methods to compare the at least one feature sensed by the driving-environment sensor system to the information in the localization map.

10. A system for localizing a highly automated vehicle (HAV) in a digital localization map, comprising:
    at least one first sensor for sensing features of semi-static objects in an environment of the HAV;
    a communication interface for transmitting the features of the semi-static objects to an evaluation unit, wherein the evaluation unit:
       classifies the semi-static objects, wherein a feature "semi-static" is assigned to the semi-static objects as a result of the classification,
       transfers the features of the semi-static objects into a local driving-environment model of the HAV, in creating the local driving-environment model, and checks whether landmarks suitable for localizing the HAV are hidden by the semi-static objects in terms of at least one of the position and an approach trajectory of the HAV, and
       integrates only those landmarks into the local driving-environment model that are not hidden by the semi-static objects in terms of the at least one of the position and the approach trajectory of the HAV,
       wherein the communication interface transmits the local driving-environment model to the HAV as a digital localization map; and
    one of a driver-assistance system and a control of the HAV for localizing the HAV using the digital localization map and driving-environment sensors of the HAV.

11. A computer-readable medium on which is stored program code that is executable by a processor of a computer, and that, when executed, causes the processor to perform a method for localizing a highly automated vehicle (HAV) in a digital localization map, the method comprising:
    sensing features of semi-static objects in an environment of the HAV with the aid of at least one first sensor;
    transmitting the features of the semi-static objects and a vehicle position to an evaluation unit;
    classifying the semi-static objects, wherein a feature "semi-static" is assigned to the semi-static objects as a result of the classification;
    transferring the features of the semi-static objects into a local driving-environment model of the HAV, in creating the local driving-environment model, and checking whether landmarks suitable for localizing the HAV are hidden by the semi-static objects in terms of at least one of the position and an approach trajectory of the HAV;
    transmitting the local driving-environment model to the HAV as a digital localization map that contains only those landmarks suitable for localizing the HAV that are not hidden by the semi-static objects in terms of the at least one of the position and the approach trajectory of the HAV; and
    localizing the HAV using the digital localization map.

12. A method for a highly automated vehicle (HAV) that is at a vehicle position within an environment of the HAV, the method comprising:
    obtaining, via at least one sensor, data indicating at least one object feature that is in the environment of the HAV;
    based on the obtained data, classifying an object, to which the at least one object feature corresponds and that is in the environment of the HAV, as being a semi-static object;
    based on the classification of the semi-static object, generating a local driving-environment model of the environment of the HAV by including in the local driving-environment model at least one of a plurality of permanent landmarks that are predefined for the environment within which the HAV is positioned, with one or more of the plurality of permanent landmarks that are predefined for the environment within which the HAV is positioned not being included in the local driving-environment model, wherein the generating includes, for each of the plurality of permanent landmarks that are predefined for the environment within which the HAV is positioned:

determining, based on (a) a relative position of the semi-static object to the respective permanent landmark and the HAV and (b) a trajectory of movement of the HAV relative to the semi-static object and the respective permanent landmark, whether the respective permanent landmark is blocked by the semi-static object from being sensed by the HAV; and selecting whether to include the respective permanent landmark in the local driving-environment model depending on a result of the determination, inclusion of the respective landmark in the local driving-environment model being conditional upon that the result of the determination is that the respective landmark is not determined to be blocked by the semi-static object, the respective landmark otherwise not being included in the local driving-environment model; and providing the generated local driving-environment model for performing a precise determination of a positional coordinate of the HAV by using output of the at least one sensor to identify the HAV relative to the at least one of the plurality of permanent landmarks that has been included in the generated local driving-environment model.

13. The method as recited in claim 12, wherein the HAV is configured to perform the precise determination using the generated local driving-environment model.

14. The method as recited in claim 13, wherein the precise determination is performed by comparing sensed features in the environment of the HAV to features of those of the at least one of the plurality of permanent landmarks that is in in the local driving-environment model, to identify the at least one of the plurality of permanent landmarks in the environment and identify a position of the HAV relative to the identified at least one of the plurality of permanent landmarks in the environment.

* * * * *